(12) United States Patent
Longstaff et al.

(10) Patent No.: US 10,088,564 B2
(45) Date of Patent: Oct. 2, 2018

(54) SCREENING SYSTEM AND METHOD

(71) Applicant: TELEDYNE AUSTRALIA PTY LTD, Eight Mile Plains (AU)

(72) Inventors: Dennis Ian Longstaff, West End (AU); Halappa Ashoka, Forest Lake (AU)

(73) Assignee: TELEDYNE AUSTRALIA PTY LTD, Queensland (AU)

( * ) Notice: Subject to any disclaimer, the term of this patent is extended or adjusted under 35 U.S.C. 154(b) by 351 days.

(21) Appl. No.: 14/915,572

(22) PCT Filed: Aug. 29, 2014

(86) PCT No.: PCT/AU2014/000854
§ 371 (c)(1),
(2) Date: Feb. 29, 2016

(87) PCT Pub. No.: WO2015/031934
PCT Pub. Date: Mar. 12, 2015

(65) Prior Publication Data
US 2016/0209506 A1    Jul. 21, 2016

(30) Foreign Application Priority Data

Sep. 4, 2013  (AU) ................................ 2013903375

(51) Int. Cl.
*G01S 13/00*     (2006.01)
*G01S 13/88*     (2006.01)
(Continued)

(52) U.S. Cl.
CPC ............ *G01S 13/887* (2013.01); *G01S 7/024* (2013.01); *G01S 7/35* (2013.01); *G01S 13/003* (2013.01);
(Continued)

(58) Field of Classification Search
CPC .... G01S 13/003; G01S 13/325; G01S 13/887; G01S 13/89; G01S 13/9035; G01S 2013/9064; G01S 7/024; G01S 7/35
(Continued)

(56) References Cited

U.S. PATENT DOCUMENTS

| | | | |
|---|---|---|---|
| 7,978,120 B2* | 7/2011 | Longstaff | G01S 7/414 342/179 |
| 2008/0100510 A1* | 5/2008 | Bonthron | G01S 7/024 342/373 |

(Continued)

OTHER PUBLICATIONS

International Search Report for PCT/AU2014/000854, dated Oct. 20, 2014 (4 pages).
(Continued)

*Primary Examiner* — Timothy A Brainard
(74) *Attorney, Agent, or Firm* — K&L Gates LLP

(57) ABSTRACT

A radar screening system that detects an object in a region of interest by transmitting coded signals having a first polarization and receiving coded return signals having at least a second polarization. Suitably the transmitted signals have one polarization and some return signals have the same polarization and other return signals have an orthogonal polarization. The return signals are processed into voxels to calculate at least a cross-polar value at each voxel. Voxels are identified as being from an object of interest if an indicator using at least the cross-polar value exceeds a threshold. Preferably the indicator uses at least a ratio of the cross-polar value and the co-polar value. The radar screening system may also perform automatic target recognition by taking into account shape and location of the object of interest.

20 Claims, 8 Drawing Sheets

(51) Int. Cl.
  *G01S 7/02* (2006.01)
  *G01S 7/35* (2006.01)
  *G01S 13/32* (2006.01)
  *G01S 13/89* (2006.01)
  *G01S 13/90* (2006.01)
(52) U.S. Cl.
  CPC .......... *G01S 13/325* (2013.01); *G01S 13/89* (2013.01); *G01S 13/9035* (2013.01); *G01S 2013/9064* (2013.01)
(58) Field of Classification Search
  USPC .......................................................... 342/22
  See application file for complete search history.

(56) References Cited

U.S. PATENT DOCUMENTS

2008/0284636 A1* 11/2008 Hausner .................. G01V 3/12
                                                              342/22
2011/0279669 A1   11/2011 Longstaff
2012/0019407 A1    1/2012 Lesturgie
2012/0105268 A1    5/2012 Smits et al.

OTHER PUBLICATIONS

Written Opinion for PCT/AU2014/000854, dated Oct. 20, 2014 (4 pages).
Extended European Search Report for EP14841839, dated Mar. 15, 2017.
International Preliminary Report on Patentability for PCT/AU2014/000854, dated Mar. 8, 2016.
Alexis Paolo Garcia Ariza et al., 60 GHz Polarimetric MIMO Sensing: Architectures and Technology, 6th European Conference on Antennas and Propagation (EUCAP), Mar. 30, 2012, pp. 2578-2585.
Guimei Zheng et al., "Angle and polarization estimation using ESPRIT with polarimetric MIMO radar," IET International Conference on Radar Systems (RADAR 2012), Oct. 25, 2012, pp. 1-4.

* cited by examiner

SCREENING SYSTEM AND METHOD

CROSS-REFERENCE TO RELATED APPLICATIONS

This application is the U.S. National Stage Entry under 35 U.S.C. § 371 and claims the benefit under 35 U.S.C. § 365(c) of International Patent Application No. PCT/AU2014/000854, entitled SCREENING SYSTEM AND METHOD, filed Aug. 29, 2014, which claims priority under 35 U.S.C. § 365(b) and 35 U.S.C. § 119(a) of Australian Patent Application No. 2013903375, entitled IMAGING SYSTEM AND METHOD UTILISING POLARIZATION, filed Sep. 4, 2013, the entire disclosures of which are hereby incorporated by reference herein.

FIELD OF THE INVENTION

The present invention relates to the field of radar imaging. In particular, it relates to the use of radar imaging to detect and possibly classify concealed objects. The invention relates particularly to security screening and risk assessment.

BACKGROUND TO THE INVENTION

In our earlier filed international application published as WO 2009/036507, we described a radar imaging system for capturing an image of an object within an area of interest. The content of the international publication is incorporated by reference.

The radar imaging system described in WO 2009/036507 comprises a radar array with a plurality of transmitter elements and a plurality of receiver elements. The radar uses a coherent MIMO (multiple input multiple output) technique to generate synthetic elements. In simple terms, each transmitter transmits a uniquely coded signal which is received by the receivers. The codes of the coded signals are used to isolate each unique transmitter/receiver path so that a three-dimensional image can be constructed. Various coding schemes are discussed including frequency division multiplexing (FDM), orthogonal frequency division multiplexing (OFDM), step frequency sequences and versions of code division multiplexing (CDM).

Coherent MIMO radars offer a number of advantages, notably in terms of reduced cost compared with a fully-filled phased-array radar aperture, and the ability to simultaneously monitor all beams in a sector of interest in contrast to scanning beam radars.

In many respects MIMO radars have similar imaging characteristics to Synthetic Aperture Radar (SAR). This is because each receiver element of the MIMO radar separately decodes the reflections from each transmitter; likewise each receiver of a SAR separately collects the reflections from each transmitter position. The great advantage of this is it enables the phase shifts required to focus the transmitter on any one beam or pixel at any distance to be applied on reception. Hence, like SAR, a MIMO radar can perform imaging in the near field where the pixel size can be much smaller than the aperture size.

The imaging system and method described in our earlier patent application has proven useful for detecting concealed objects in, for example, walk-through body scanning but has not been able to adequately classify the object for risk assessment.

Reference may also be had to Published United States Patent Application 2008/0284636 assigned to Safe Zone Systems. This patent application also aims to detect objects using radar signals. The Safe Zone Systems approach is to transmit a radar signal of one polarization and to use complex neural network pattern recognition of the co-polar and cross-polar returns to identify if a weapon is present. The Safe Zone System does not create an image of the object, instead relying upon signatures in the radar signals to flag if a weapon or other threat may be present. Because Safe Zone Systems does not have any spatial resolution it cannot avoid false negatives and it cannot classify the threat. For instance, the Safe Zone Systems invention would identify a pair of metal frame glasses as a threat on the basis of the radar cross section because it cannot identify the location as being non-threatening. In essence, the Safe Zone Systems approach is to highlight as a risk any person that generates a radar cross section that is greater than the average radar cross section of a person without a weapon.

The reference to any prior art in this specification is not, and should not be taken as, an acknowledgement or any form of suggestion that the prior art forms part of the common general knowledge in Australia.

SUMMARY OF THE INVENTION

In one form, although it need not be the only or indeed the broadest form, the invention resides in a radar screening system for detecting an object in a region of interest comprising:

at least one radar array, said at least one radar array including:

a plurality of transmitter elements that transmit a plurality of differently coded signals toward the object, the coded signals having at least a first polarization; and a plurality of receiver elements that receive a plurality of coded return signals reflected from the object, the coded return signals having at least a second polarization orthogonal to the first polarization; and at least one processor coupled to the plurality of transmitter elements and the plurality of receiver elements, said at least one processor being adapted to:

decode the plurality of coded return signals reflected from the object;

extract from the decoded plurality of coded return signals a multiplicity of captured signals for each transmitter to receiver path;

align the multiplicity of captured signals to be substantially time and phase coincident for each voxel in a region of interest;

sum the aligned captured signals for each voxel it the region of interest;

calculate at least a cross-polar value representing the cross-polar radar crossection at each voxel; and identify a voxel as from an object of interest if an indicator calculated using at least the cross-polar value exceeds a threshold.

Preferably the receiver elements comprise first receiver elements that receive a plurality of coded return signals reflected from the object that have a polarization orthogonal to the first polarization and second receiver elements that receive a plurality of coded return signals reflected from the object that have the same polarization as the first polarization.

Alternatively, the transmitter elements comprise first transmitter elements that transmit a plurality of coded signals that have a first polarization and second transmitter elements that transmit a plurality of coded signals that have a polarization orthogonal to the first polarization.

The processor suitably calculates an indicator being the ratio of co-polar and cross-polar values in each voxel of the image. The co-polar value is the ratio of transmitted power to received power for signals having the same polarization and the cross-polar value is the ratio of transmitted power to received power for signals having orthogonal polarization.

The first polarization and second polarization may be linear polarizations but more preferably are right and left circular polarization. In the more general sense the polarizations may be elliptical, provided they are orthogonal.

A voxel identified as of interest, based on the ratio of cross-polar and co-polar signals forming that voxel, may be highlighted on an image formed of the object and/or an alarm may be raised. The image so formed may be the radar image or a video image from a sensor co-located with the radar. The alarm may have a level based on location, size and shape measures, formulated from the voxels of interest.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
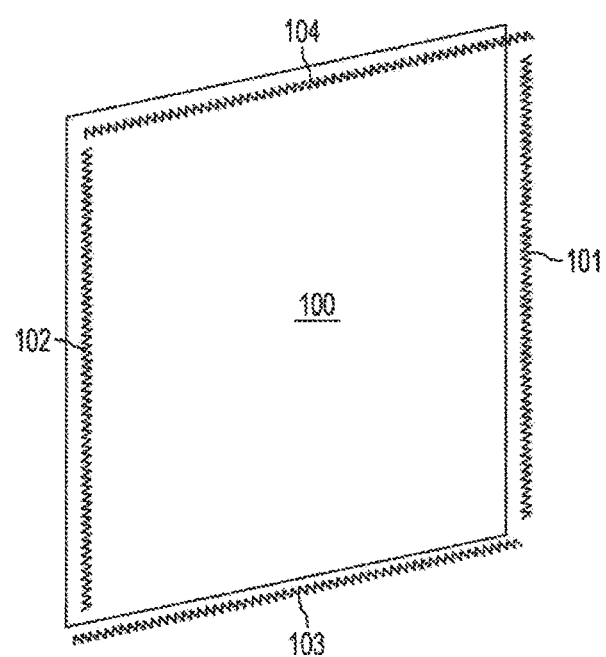
FIG. 1 is a sketch of one preferred configuration of a radar array for use in a first embodiment of the invention.

Embodiments of the present invention reside primarily in a radar screening system using polarization and other measures for the purpose of screening people for hazardous items. Accordingly, the apparatus elements and method steps have been illustrated and described in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus. Where pixel is used it is understood to be a two-dimensional view of a three-dimensional voxel. Where co-polar and cross-polar are used it is understood to refer to a pair of electromagnetic waves which are separable based on the direction of their electric vectors. A reference to a cross-polar value or a co-polar value is referring to a value representing the cross-polar or co-polar radar cross-section respectively.

Referring to FIG. 1 there is shown an example of one possible configuration of a radar array for a screening system according to one embodiment of the present invention. The radar array 100 comprises a square perimeter array having vertical sides 101, 102 and horizontal sides 103, 104. A suitable size for a walk-by body scanning application is 1.3 m×1.3 m nominal size with 128 receiver or transmitter elements along each side. This arrangement gives 16 k-pixels for forming an image, as described in detail below. Persons of ordinary skill in the field will recognize that other size arrays will also be suitable. For instance, our earlier filed application described a walk-through array of 2.5 m×2.5 m and a hand-held array is described below which is 60 cm×60 cm.

Our earlier application explained that millimeter waves penetrate clothing, but the higher the frequency the higher the reflection coefficient from heavy clothing such as leather. Lower frequencies require a larger aperture for a given resolution. The preferred embodiment uses a selected frequency of 35 GHz as a good compromise, with an effective aperture of 1.25 m. An analysis of the point spread functions with this arrangement indicates a resolving power sufficient to resolve the shape of a hand-gun at 4 m standoff distance. The invention is not limited to this selected frequency. Other suitable frequencies might be in the range of 10 GHz to 100 GHz, depending on the constraint and needs of a particular application.

The perimeter array of FIG. 1 is formed comprising two parallel linear transmitter arrays mounted orthogonally to two parallel receiver arrays. This gives an equivalent SAR array in the far field, with synthesized elements located midway between each transmitter and receiver pair of elements, hence filling the square aperture with synthesized elements. The array can be focused to any range in the near field because the signals from all combinations of transmitter-to-voxel-to-receiver paths are available for processing. To focus the array the received signals are weighted in amplitude and phase prior to further processing.

The advance of the present invention compared to the invention described in WO 2009/036507 resides in the use of polarization discrimination to improve the detectability of objects of interest. The use of polarization can be achieved in a variety of ways. For instance, a single polarization may be transmitted and an orthogonal polarization collected. It may be that the transmitter elements all transmit with a vertical polarization and the receiver elements only receive horizontal polarization. The converse would also be possible. This greatly reduces signals due to specular reflections since specular reflections are normally the same polarization as the incident illumination. Most reflections from a human body are specular reflections with the received polarization being the same as the transmitted polarization. In contrast, wires and objects with complex shapes reflect with a mixed polarization. This difference can be exploited to identify components of a person borne improvised explosive device (PBIED) or other dangerous objects.

Although linear polarization is mentioned the invention is not so limited. The requirement is for orthogonal polarizations. Thus, right hand circular polarization and left hand circular polarization can also be utilized. In fact, the most general case is the use of elliptical polarization, providing orthogonal polarizations. Persons skilled in the art will be familiar with the concept of orthogonal polarization.

Another option is to have the transmitter elements transmit on both polarizations and the receiver elements receive on one polarization. The converse would also be possible, that is to have the transmitter elements transmit on one polarization but the receiver elements receive on two polarizations. For instance, the transmitter elements may transmit right hand circular polarized radio waves and the receiver elements may alternately detect right hand circular polarized and left hand circular polarized radio waves. This embodiment allows for a ratio to be formed between the cross-polar signal (receiving the orthogonal polarization to what is transmitted) and the co-polar signal (receiving the same polarization as transmitted).

Yet another option is to have transmitter elements for both polarizations and receiver elements for both polarizations. This embodiment has the potential to yield information regarding the nature of any object imaged by the radar.

Figure 6:
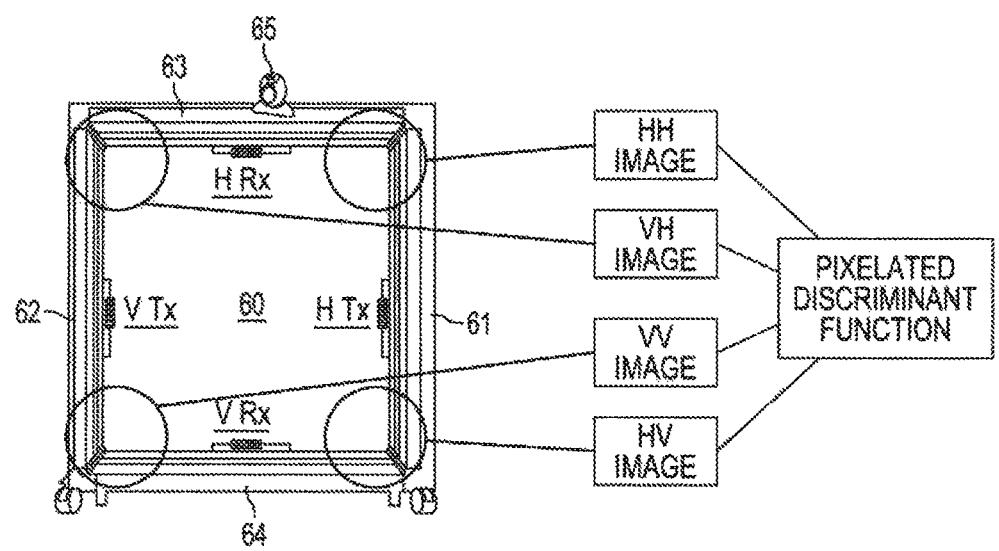
FIG. 6 is a sketch of another preferred configuration of a radar array for use in a second embodiment of the invention.

For instance, a further embodiment is to use the square array of FIG. 1 and transmit one polarization from one linear transmitter array and an orthogonal polarization from the parallel linear transmitter array. Similarly, the receiver arrays receive orthogonal polarized signals. This arrangement is illustrated in FIG. 6. By way of an example, the vertical linear array 101 may transmit radio waves with horizontal polarization and the vertical linear array 102 may transmit radio waves with vertical polarization. The horizontal linear array 103 may receive radio waves with vertical polarization and the horizontal linear array 104 may receive radio waves with horizontal polarization. This arrangement gives the full data set of images formed from HH, VH, VV and HV, where HH means transmit radio waves with horizontal polarization and receive radio waves with horizontal polarization, VH means transmit radio waves with vertical polarization and receive radio waves with horizontal polarization, VV means transmit radio waves with vertical polarization and receive radio waves with vertical polarization, and HV means transmit radio waves with horizontal polarization and receive radio waves with vertical polarization. These images can then be processed in a variety of ways to classify and provide an alarm level for objects detected in the image. For example, a simple threshold may be applied, various simple ratios may be determined, or more complex ratios may be calculated. The processor may take account of the spatial distribution of such detected voxels to classify the object seen on the basis of shape, size and location. For instance, the full polarization signature will show the orientation of a linear reflector. A line of pixels on a persons body following the same direction as the pixel polarization would indicate a wire and the need for a high level alarm. Likewise, cross-polar returns from spectacles could be discounted on the basis of location of the image.

If circular polarized radio waves are employed the same benefits accrue with LL, LR, RL and RR polarization combinations, where L means left polarized radio waves and R means right polarized radio waves.

Figure 2:
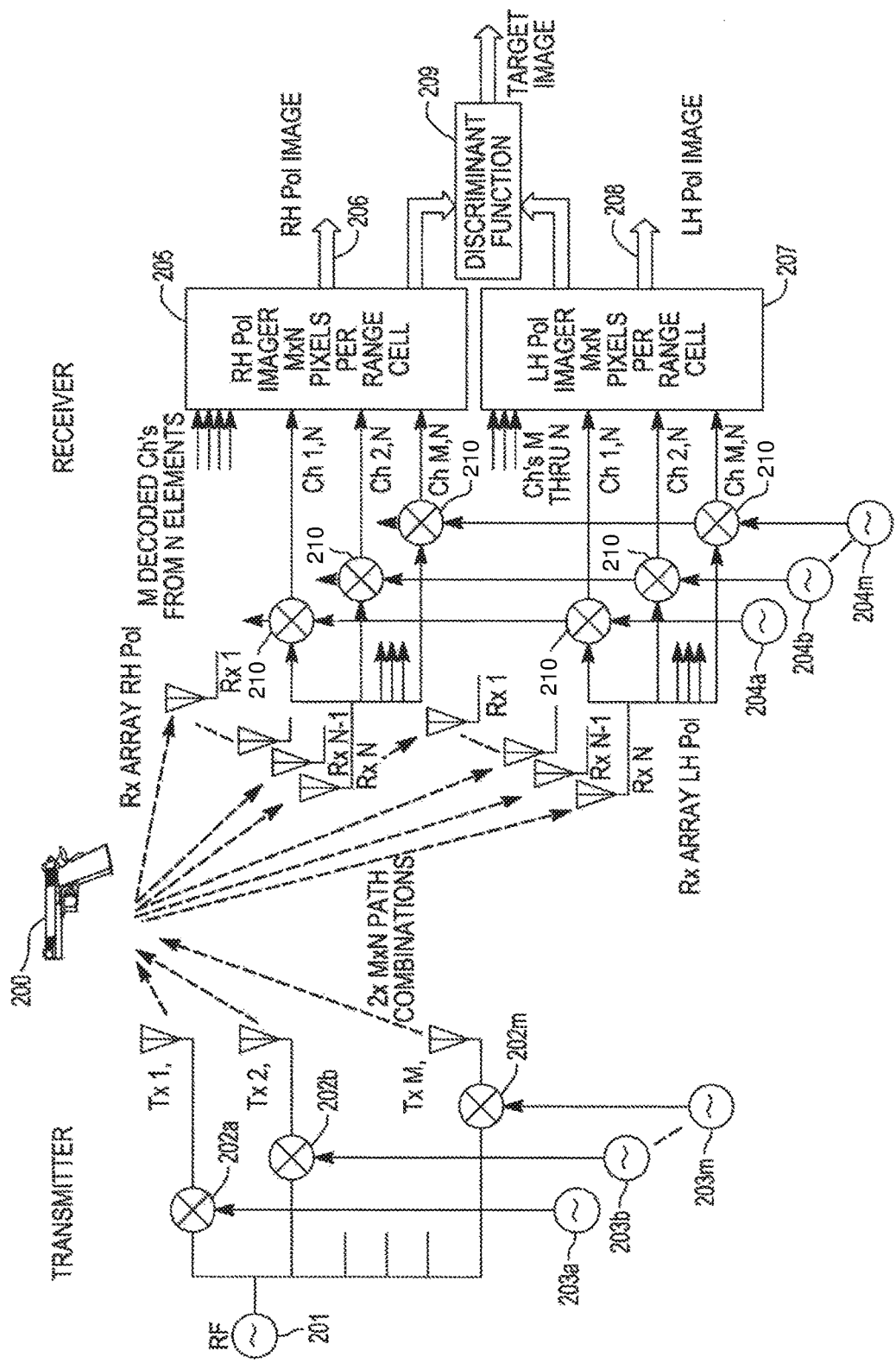
FIG. 2 is a schematic of the relevant electronics of a radar array according to an embodiment of the invention.

To explain how this may be put into effect reference is made to the schematic of FIG. 2. FIG. 2 shows an object 200 to be detected and possibly classified. An RF signal generator 201 is in signal connection with RE mixers 202 (labeled 202a through 202m to depict a plurality of identical mixers). There are encoders 203 (labeled 203a through 203m to depict a plurality of identical encoders) which each generate a unique code that is mixed in each RF mixer 202 with the RF signal from the RF signal generator 201. The encoded RF signals are transmitted towards the object 200 by RF antenna elements Tx (labeled $Tx_1$ through $Tx_m$, to depict a plurality of identical antenna elements). Each transmitter antenna Tx transmits a radio frequency signal that is, say, right hand polarized. In the preferred embodiment m=128.

As explained in our earlier application WO 2009/036507, the transmitter elements may be arranged into sub-arrays of, say, eight elements with a switching network to activate various elements according to an efficient transmission cycle. Persons of ordinary skill in the art will appreciate how to arrange the RF mixers 202, encoders 203 and antennas Tx for efficient operation. The schematic of FIG. 2 omits other elements described in our earlier application such as low noise amplifiers, analog-to-digital converters, buffers and pulse shapers. The omission of these elements does not imply that they are not present in an operating radar.

Reflections from the object 200 are received by antenna elements Rx (labeled $Rx_1$ through $Rx_n$, to depict a plurality of identical antenna elements) that receive signals with right hand polarization and left hand polarization. For ease of explanation FIG. 2 shows separate components for the right hand polarization channel and the left hand polarization channel, however, as described below, the same receivers can receive both left and right circular polarized signals. There are decoders 204 (labeled 204a through 204m to depict a plurality of identical decoders) which generate decoder signals that are mixed with the signals from the receiver elements Rx in mixers 210 to produce unique output signals for each transmitter/receiver path.

From FIG. 2 it will be understood that there are M transmitter elements each transmitting a signal with a unique code and having right hand polarization. There are N receiver elements detecting signals with right hand polarization which are decoded with the codes applied to the transmitter elements to produce M×N measurements. There are also N receiver elements detecting signals with left hand polarization which are decoded with the codes applied to the transmitter elements to produce M×N measurements. Thus there are at total of 2×M×N separate measurements to be processed to form co-polar (same polarization transmitted and received) and cross-polar (orthogonal polarization received compared to transmitted) images.

The codes must be unique and are preferably orthogonal. Suitable codes include orthogonal frequency division multiplexing (OFDM) or time division multiplexing (TDM) with wide time intervals.

Co-polar processor 205 processes the signals to produce a co-polar image 206 and cross-polar processor 207 processes the signals to produce a cross-polar image 208. The processing may be in similar manner to that described in earlier application WO 2009/036507. In summary, processing divides the analysis volume (say 2 m×2 m by 0.5 m depth of focus) into resolution cells (say 5 mm cubes or "voxels"). The path length from each transmitter element $Tx_m$ to each voxel of the required image, and back to each receiver element $Rx_n$, is converted to a time of flight, or delay time, and stored in the processor unit. Then, to form an image, the intensity of each voxel of the image is derived using the stored time delays to adjust the time delays of all the M by N received signals such that they are time and phase coincident prior to summing.

If required, the data collected to form an image of the scene with no persons present can be taken in this way and subtracted from the data forming the scene when a person enters the scene. This background subtraction process allows a clutter free image of the person.

The voxels together produce a 3D image from which a 2D image is obtained for display. Examples of images are described below by reference to FIG. 7. These were taken with the background subtraction process.

Although the cross-polar image 208 may be analyzed to detect an object 200, it has been found that the cross-polar to co-polar ratio is particularly useful. The ratio can be calculated on a voxel by voxel basis in a discrimination processor 209 which may also store a database of object signatures to classify or even identify the detected object.

Although a separate co-polar processor 205, cross-polar processor 207 and discrimination processor 209 have been described and shown in FIG. 2, a person of ordinary skill in the art will realize that all functions can be provided by a single processor.

Figure 3:
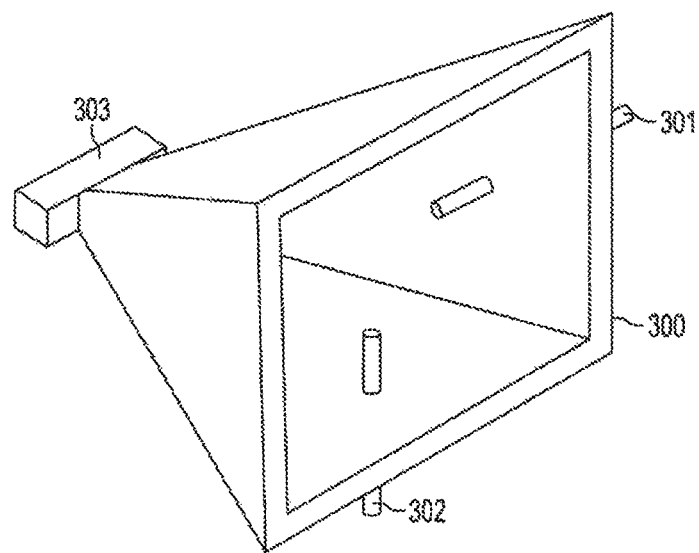
FIG. 3 is a sketch of a receiver antenna element.

It will also be appreciated by a person of ordinary skill in the art that separate receiver antenna elements are not required for detecting orthogonal polarizations. For example, the horn antenna 300 shown schematically in FIG. 3 may have horizontal feed 301 and vertical feed 302. Electronics 303 receive a signal from the horizontal feed 301 to detect horizontally polarized signals or receive a signal from the vertical feed 302 to detect vertically polarized signals. The feeds 301, 302 may be switched as required to detect horizontal or vertical polarizations as desired. It is also evident that right circular polarized signals and left circular polarized signals may be detected by applying a suitable phase delay between the measurements from the horizontal feed 301 and the vertical feed 302.

Figure 4:
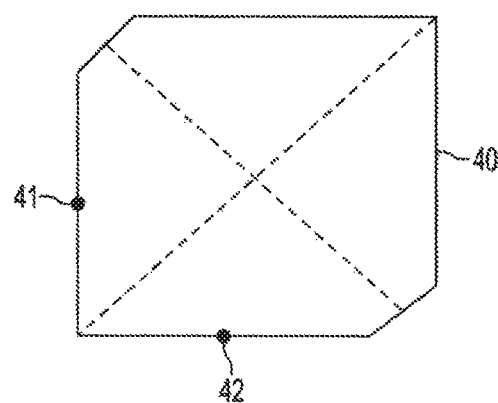
FIG. 4 is a sketch of an alternate receiver element.

The same result is achievable with the patch antenna shown in FIG. 4. A patch antenna 40 is typically a copper layer of the shape shown, formed on a dielectric substrate, on a conducting groundplane. The first feed point 41 on one edge transmits (or receives) one hand of circular polarization and an orthogonal feed point 42 at an adjacent edge transmits for receives) the orthogonal polarization.

Persons familiar with the art would also appreciate that many other antenna forms (such as dipoles, slots, spirals and loops) can transmit and receive specific polarizations which would be suitable for the screening system.

Figure 5A:
FIGS. 5A and 5B display how shape is evident in a radar image.
Figure 5B:
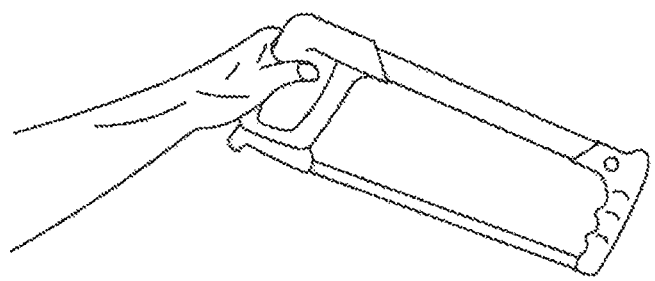

As mentioned above, the radar screening system achieves a resolution sufficient to resolve the shape of relatively small items. By way of example the radar image in FIG. 5A was taken using a radar similar to that depicted in FIG. 2. The radar is an array of 128×128 elements and the image in FIG. 5A is taken at a range of 4 m. The image clearly shows a rough image of a person with a much clearer image of a hacksaw being held by the person. FIG. 5B shows a photo of the hacksaw imaged in FIG. 5A. This demonstrates the resolution of the radar screening system to produce an image of an object that can be classified according to shape and location. Thus, for example, an object such as a pair of metal spectacles would be detected by the radar screening system but would be classified as non-threatening on the basis of shape and or location.

As mentioned in our earlier application, the invention need not be limited to a square perimeter array. Other arrangements of transmit and receive arrays may include 'L', cross, rectangular, octagonal or circular.

By way of example, a preferred embodiment of the invention as shown in FIG. 6 has been used to produce the images of FIG. 7. The embodiment of FIG. 6 is a 1.25 m square perimeter array 60 operating at 35 GHz with 64 transmitter or receiver elements in each array for a total of 128 transmitter elements and 128 receiver elements. The microwave antennas are horn antennas arranged to transmit vertical polarization from the left vertical array 62 and horizontal polarization from the right vertical array 61. The top receiver array 63 is configured to receive horizontal polarization and the bottom receiver array 64 is configured to receive vertical polarization. This allows images to be produced that are HH, VH, HV and VV. Effectively the configuration is four 'L' antenna arrays. Various ratios of these images can be produced. One suitable output is a simple ratio of co-polar and cross-polar signal amplitude in each voxel. If the cross-polar signal exceeds the co-polar signal by a suitable margin the voxel is highlighted.

Time division multiplexing is employed for orthogonal coding in the manner described in WO 2009/036507. The complete data set is captured and processed in about 100 msec, allowing a walking person to be imaged at 10 frames per second.

A video camera 65 is located on the array 60 and has a similar field of view. The camera allows radar images of the detected target only to be overlaid on a visible image, thus alleviating concerns of modesty that are sometimes raised in relation to radar images. Such a camera may also assist the process of assigning an alarm level based on the location on the body of detected pixels of interest.

Figure 7A:
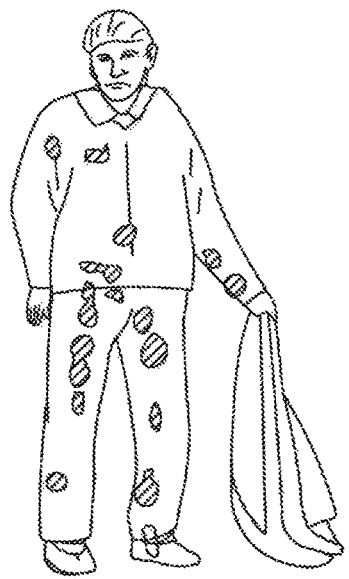
FIGS. 7A-7D show images taken with the second embodiment of FIG. 6.
Figure 7B:
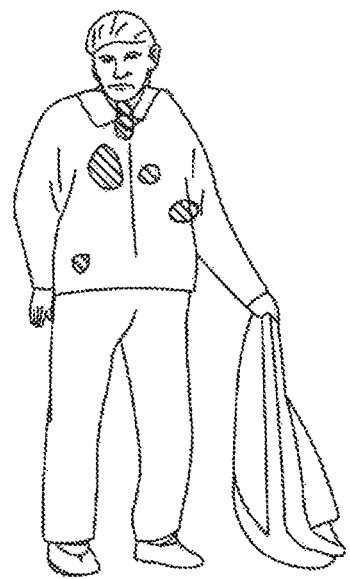
Figure 7C:
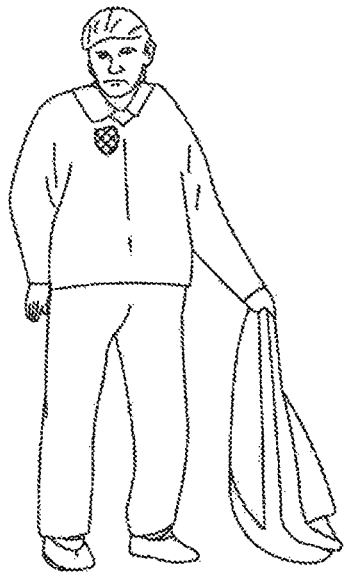

The images of FIGS. 7A-7D are radar images of an object overlaid on a video image of a person carrying the object. The object is a bag of small metal pieces that represent the shrapnel of a PBIED. FIG. 7A shows the co-polar image. That is, the image obtained when the receivers receive signals with the same polarization as the transmitted signal. The co-polar images (shown as hatching sloping upwards to the right in FIG. 7A) may be colour-coded or otherwise labelled and do not strongly indicated the presence of a PBIED. FIG. 7B shows the cross-polar image. That is, the image obtained when the receivers receive signals with the orthogonal polarization to the transmitted polarization. The cross-polar images (shown as hatching sloping upwards to the left in FIG. 7B) may be colour coded or otherwise labelled and do indicate the presence of a PBIED, being the brighter pixels near the right shoulder of the person. This indicates that the cross-polar image can be used to detect an object by highlighting pixels if the cross-polar signal amplitude exceeds a threshold set by the co-polar signal amplitude.

Figure 7D:
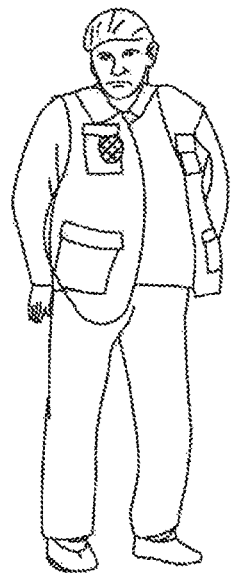

Using cross-polar and co-polar discrimination, in this case the ratio of the amplitudes of the voxels, gives a much clearer indication of the PBIED. It is shown clearly in FIG. 7C (shown as cross hatching). Even when covered with clothing the PBIED is clearly identified as seen in FIG. 7D.

The series of images in FIGS. 7A-7D demonstrate the usefulness of the invention for detecting objects of interest, such as a PBIED, when concealed under clothing or other form of visual impairment. The visual impairment may be an environmental factor such as low light, dust, dirt, vapor or smoke. It may also be cloth, paper, plastic or other film that partially or fully covers the object.

It is also evident from FIGS. 5A-5B and FIGS. 7A-7D that the use of video to show the person being scanned is not essential. The radar signals give a rough outline of the human figure. In many instances this will be sufficient to identify the location of an object of interest. For privacy reasons it may be preferable to not show a video of the person being scanned. On the other hand, in some cases the radar images is considered to be more invasive in which case just the image of the target may be overlaid on an avatar image, as described below with reference to the embodiment of FIG. 9.

Figure 8:
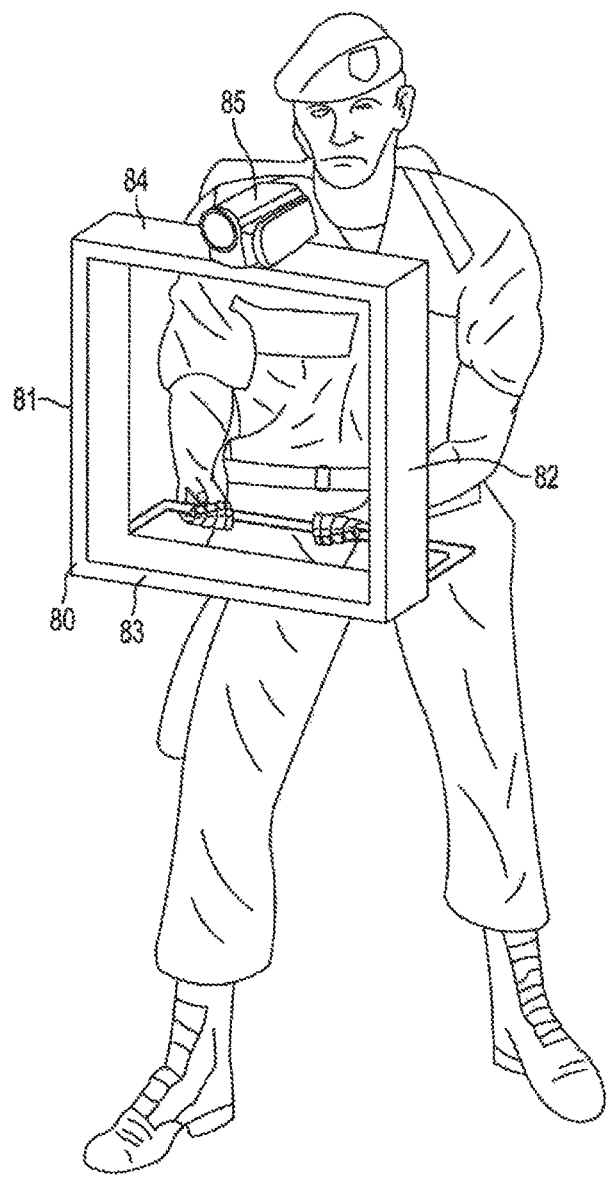
FIG. 8 is a sketch of a third embodiment of the invention.

Another embodiment of the invention is displayed conceptually in FIG. 8. The embodiment of FIG. 8 is designed as a handheld body scanner 80 with a range up to about 50 m. The square array has a side of 60 cm and has 32 patch antenna elements on each side. The scanner produces a single focused beam at a fixed distance. Each side linear array 81, 82 transmits right circular polarized signals. The upper linear array 84 and lower linear array 83 have receivers that receive right circular polarized signals and left circular polarized signals depending on the switching configuration as described above. A camera 85 is boresighted to the focal point of the radar and provides a crosswire for aiming. A power supply and electronics are provided in a backpack (not shown) carried by the user.

In use, the user directs the scanner 80 at a target by looking at the output of the video camera 85. A color indicator (similar to FIG. 7C) is displayed if a suspect object is identified.

Figure 9:
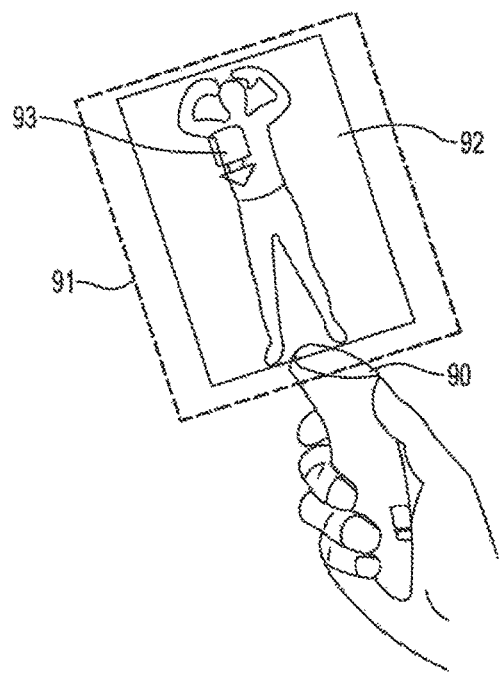
FIG. 9 is a sketch of a fourth embodiment of the invention.

Another embodiment of the invention is depicted in FIG. 9. The embodiment of FIG. 9 is a small hand held radar screening system 90 that operates at 60 GHz or 94 GHz. The antenna array 91 is formed on the front of the detector and a liquid crystal display (LCD) 92 is deployed, on the back. The LCD does not actually show the person but instead shows an avatar schematic of a person, or part of a person. The display indicates where the user should point the device and the LCD displays the result of a scan. The display highlights a threat detection 93 in red in the general location of the threat.

The device of FIG. 9 is a lightweight and low cost phased array millimeter-wave imager using the MIME technique described above. The focal plane is swept in range to collect a three dimensional image, and so form the surface contour of the body and any objects hidden under clothing. The measured contour is tested for abnormal features, such as shape and location. The radar waves reflect from the surfaces of plastics where phase contrast imaging and phase unwrapping assist in locating suspect substances. A prompt shown on the avatar image directs the user through a fixed set of observation positions for a complete scan and to regularize the data sets for pattern recognition/contour testing. This embodiment may suit applications where the pat-down of a person is required but considered invasive. This could replace the hand-held metal detector commonly used for such situations, or be used in conjunction with a metal detector.

Figure 10:
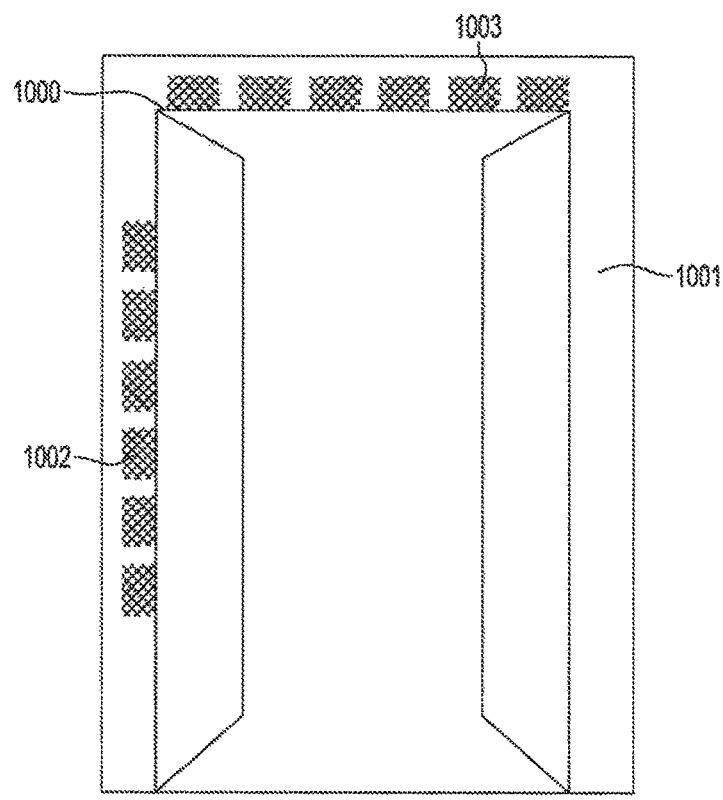
FIG. 10 is a sketch of a fifth embodiment of the invention.

A further embodiment is depicted in FIG. 10. In this embodiment an 'L' antenna array 1000 is covertly positioned in a doorway 1001. The radar screening system is otherwise similar to the previously described embodiments and operates in a similar manner. The radar screening system may have a vertical linear array 1002 that transmits, say, circular polarized radio waves with a right hand polarization. The horizontal linear array 1003 has antenna elements to receive circular polarization that has right hand or left hand polarization. For this covert implementation the patch antenna elements are appropriate and the same receiver elements are switched to receive right hand circular polarized radio waves or left hand circular polarized radio waves.

The embodiment will image a person approaching the doorway and detect objects of interest. Persons of ordinary skill in the art will realize that a similar array mounted on the inside of the doorway (not shown) will image the back of a person as they walk away from the doorway. The combination of a radar screening system with an 'L' antenna array on the outside and an 'L' antenna array on the inside will allow the front and back of a person to be imaged. With appropriate switching the same electronics may be usable for both antenna arrays.

Although most reflections from a person are the same polarization as the transmitted polarization there are some cross-polar reflections which can give rise to false alarms. These cross-polar reflections arise from multiple reflections, such as between an arm and the torso. Typically these cross-polar reflections change over time due to movement of the person. The false alarms can be reduced or eliminated by monitoring a time history of signals. Signals having a threshold of persistence are identified as being due to objects of interest.

An object detected by the radar screening system of the invention may be classified according to the ratio of the cross-polar and co-polar signals and the shape of the spatial distribution of co-polar and cross-polar radar signatures. A database of radar signatures and ratios may be compiled using known objects. A measurement of an unknown object may then be compared to a known object to classify the unknown object as likely being one of the known objects.

Once an object of interest is identified using any of the described techniques, the object of interest can be tracked over time and an inverse synthetic aperture technique used to construct an improved image of the object of interest. This technique takes advantage of the changing aspect of the object caused by the wearer moving. The spectrum of the time history of the signals from the tracked object reveals the spatial distribution of scattering centers in the cross-range direction normal to the axis of rotation. The detail shown may be finer than revealed by the pixels, especially at longer ranges where pixels are large.

The invention finds particular application in security scanning to detect a dangerous object being carried by a person. An object such as a gun, knife, or PBIED is easily detectable because it has a different radar signature to human skin. As mentioned above, human skin has a specular reflection that maximizes the co-polar signal whereas these items have a mixed reflection and thus produce a cross-polar signal. A threshold applied to the cross-polar signal can be used to detect pixels of interest from these objects. A ratio of the co-polar and cross-polar signals provides a more reliable detection. The addition of time history discrimination further raises the detection reliability. The location and shape formed by the detected pixels of interest can then be used for automatic target recognition or the attribution of a risk factor.

These features allow automatic target recognition without the requirement for an operator to view the radar image. The combination of radar signal, size and location are sufficient to identify an object of interest. For instance, a scoring system may be applied to calculate a value which is compared to a threshold. The value may be the simple sum of the ratio of the cross-polar signal to the co-polar signal, a size score (for example with dimensions typical of a gun, knife or explosive device scoring highest) and a location score (with locations like the hand or head scoring lowest and concealed locations scoring higher). The values may be weighted to place more emphasis on the ratio of the cross-polar signal to the co-polar signal. The score is compared to a threshold determined by analyzing scores from a range of typical measurements on persons with and without objects of interest.

The automatic target recognition may be expressed as an algorithm:

$$ATR = S \times L \times R$$

where S is the size of the target in cm$^2$; L is the location of the target according to an index such as head or hands=1, arms or legs=3, torso=5; and R is the ratio of the cross-polar signal to the co-polar signal as described above.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A radar screening system for detecting an object in a region of interest comprising:
   at least one radar array, said at least one radar array including:
      a plurality of transmitter elements that transmit a plurality of differently coded signals toward the object, the coded signals having at least a first polarization; and
      a plurality of receiver elements that receive a plurality of coded return signals reflected from the object, the coded return signals having at least a second polarization orthogonal to the first polarization; and
   at least one processor coupled to the plurality of transmitter elements and the plurality of receiver elements, said at least one processor being adapted to:
      decode the plurality of coded return signals reflected from the object;
      extract from the decoded plurality of coded return signals a multiplicity of captured signals for each transmitter to receiver path;
      align the multiplicity of captured signals to be substantially time and phase coincident for each voxel in a region of interest;
      sum the aligned captured signals for each voxel in the region of interest;
      calculate at least a cross-polar value at each voxel; and
      identify a voxel as from an object of interest if an indicator calculated using at least the cross-polar value exceeds a threshold.

2. The radar screening system of claim 1 wherein the receiver elements comprise first receiver elements that receive a plurality of coded return signals reflected from the object that have a polarization orthogonal to the first polarization and second receiver elements that receive a plurality of coded return signals reflected from the object that have the same polarization as the first polarization.

3. The radar screening system of claim 1 wherein the transmitter elements comprise first transmitter elements that transmit a plurality of coded signals that have a first polarization and second transmitter elements that transmit a plurality of coded signals that have a polarization orthogonal to the first polarization.

4. The radar screening system of claim 1 wherein the transmitter elements comprise first transmitter elements that transmit a plurality of coded signals that have a first polarization and second transmitter elements that transmit a plurality of coded signals that have a second polarization orthogonal to the first polarization, and the receiver elements comprise first receiver elements that receive coded return signals having a polarization orthogonal to the first polarization and coded return signals having a polarization parallel to the first polarization and second receiver elements that receive coded return signals having a polarization orthogonal to the second polarization and coded return signals having a polarization parallel to the second polarization.

5. The radar screening system of claim 4 wherein the first transmitter elements and the second transmitter elements are the same elements with the coded signals that have a first polarization and the coded signals that have a second polarization being transmitted at different times.

6. The radar screening system of claim 4 wherein the first receiver elements and the second receiver elements are the same elements.

7. The radar screening system of claim 1 wherein the processor calculates an indicator being the ratio of co-polar values and cross-polar values in each voxel of the image.

8. The radar screening system of claim 1 wherein the first polarization and second polarization are linear polarizations.

9. The radar screening system of claim 1 wherein the first polarization and second polarization are right and left circular polarization.

10. The radar screening system of claim 1 wherein; the first polarization and second polarization are elliptical and are orthogonal.

11. The radar screening system of claim 1 wherein a voxel identified as from an object of interest, based on a ratio of cross-polar and co-polar signals forming that voxel, is highlighted on a representative image of a person and/or an alarm is raised.

12. The radar screening system of claim 1 wherein the transmitter elements and receiver elements are horn antennas.

13. The radar screening system of claim 1 wherein the transmitter elements and receiver elements are patch antennas.

14. The radar screening system of claim 1 wherein the processor is further adapted to analyze voxels identified as from an object of interest and determine shape of the object of interest.

15. The radar screening system of claim 1 wherein the processor is further adapted to analyze voxels identified as from an object of interest and determine location of the object of interest.

16. The radar screening system of claim 1 wherein the processor is further adapted to perform automatic target recognition of the object of interest based on analysis of a ratio of cross-polar and co-polar signals; a shape of the object of interest determined from analysis of yokels identified as from the object of interest; and location of the object of interest determined from analysis of voxels identified as from the object of interest.

17. The radar screening system of claim 16 wherein the processor generates an alarm when the object of interest is identified and/or assigns a risk level to the identified object of interest.

18. The radar screening system of claim 16 wherein the object of interest is tracked in time and the signals are processed in the manner of Inverse Synthetic Aperture Radar (ISAR).

19. The radar screening system of claim 1 wherein the processor is further adapted to subtract aligned captured signals obtained from a region of interest without a target present from aligned captured signals obtained from a region of interest with a target present.

20. A method of detecting an object in a region of interest including the steps of:
- transmitting a plurality of differently coded signals toward the object, the coded signals having at least a first polarization;
- receiving a plurality of coded return signals reflected from the object, the coded return signals having at least a second polarization orthogonal to the first polarization;
- decoding the plurality of coded return signals reflected from the object;
- extracting, from the decoded plurality of coded return signals a multiplicity of captured signals for each transmitter to receiver path;
- aligning the multiplicity of captured signals to be substantially time and phase coincident for each voxel in a region of interest;
- summing the aligned captured signals for each voxel in the region of interest;
- calculating at least a cross-polar value at each voxel; and
- identifying a voxel as from an object of interest if an indicator calculated using at least the cross-polar value exceeds a threshold.

* * * * *